United States Patent
Riedel

(10) Patent No.: US 9,587,785 B2
(45) Date of Patent: Mar. 7, 2017

(54) MOTOR VEHICLE LOCK WITH AUTOMATIC RELUBRICATION

(71) Applicant: KIEKERT AKTIENGESELLSCHAFT, Heiligenhaus (DE)

(72) Inventor: Christian Riedel, Mülheim (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 394 days.

(21) Appl. No.: 14/353,089

(22) PCT Filed: Oct. 26, 2012

(86) PCT No.: PCT/IB2012/002829
§ 371 (c)(1),
(2) Date: May 9, 2014

(87) PCT Pub. No.: WO2013/057591
PCT Pub. Date: Apr. 25, 2013

(65) Prior Publication Data
US 2014/0239648 A1    Aug. 28, 2014

(30) Foreign Application Priority Data

Oct. 21, 2011  (DE) .................. 10 2011 084 960

(51) Int. Cl.
*E05C 3/06*    (2006.01)
*F16N 7/12*    (2006.01)
(Continued)

(52) U.S. Cl.
CPC ................ *F16N 7/12* (2013.01); *E05B 17/08* (2013.01); *E05B 85/26* (2013.01); *E05C 3/12* (2013.01); *Y10T 292/1075* (2015.04)

(58) Field of Classification Search
CPC .......... Y10T 292/1075; Y10T 292/1078; Y10T 292/1047; Y10T 292/1082; Y10S 292/23;
(Continued)

(56) References Cited

U.S. PATENT DOCUMENTS 5,820,175 A * 10/1998 Clavin .................... E05C 1/145
292/153

FOREIGN PATENT DOCUMENTS

DE          198 08 576 A1    9/1999
DE    10 2007 024564 A1    11/2008
(Continued)

OTHER PUBLICATIONS

Computer Generated Translation for JP 2007-92465, generated using http://worldwide.espacenet.com, generated on Sep. 20, 2016.*

(Continued)

*Primary Examiner* — Alyson M Merlino
(74) *Attorney, Agent, or Firm* — Renner, Otto, Boisselle & Sklar, LLP

(57) ABSTRACT

A lock which operates reliably and quietly has a locking mechanism with a rotary latch and at least one ratchet pawl for latching the rotary latch. The lock comprises two faces which at least partially bear one against the other and which are at least recurrently displaced relative to one another, with the result that that the displacement causes frictional forces to occur between the faces. At least one frictional face is part of a rotatable component of the lock. A lubricant reservoir is assigned to this rotatable component. There is a feeding means from the lubricant reservoir to the frictional face, which means is configured in such a way that the lubricant is transported from the lubricant reservoir to the frictional face of the rotatable component.

12 Claims, 2 Drawing Sheets

(51) Int. Cl.
*E05B 85/26* (2014.01)
*E05B 17/08* (2006.01)
*E05C 3/12* (2006.01)
*E05C 3/16* (2006.01)

(58) Field of Classification Search
CPC .......... Y10S 292/58; F16N 7/12; E05B 17/08;
E05B 85/20; E05B 85/24; E05B 85/243;
E05B 85/26; E05C 3/12
See application file for complete search history.

(56) References Cited

FOREIGN PATENT DOCUMENTS

| | | |
|---|---|---|
| EP | 0942124 A1 | 1/1999 |
| JP | 2007 092465 A | 4/2007 |

OTHER PUBLICATIONS

International Search Report for corresponding patent application No. PCT/IB2012/002829 dated Apr. 19, 2013.

* cited by examiner

MOTOR VEHICLE LOCK WITH AUTOMATIC RELUBRICATION

FIELD OF THE INVENTION

The invention refers to a lock, in particular for a motor vehicle or a building with a locking mechanism comprising a rotary latch with at least one ratchet pawl for latching the rotary latch. The locking mechanism can contain a main catch pawl for latching the rotary latch in a main catch position and an auxiliary catch pawl for latching the rotary latch in an auxiliary catch position. In addition, the arrangement can contain at least one rotatably mounted blocking lever blocking the movement of the pawl when the pawl is in its locking position. Such a lock contains a lock plate or a lock housing for mounting components of the lock theron such as rotary latch, pawl or blocking lever. The invention also refers to an associated method for relubricating a frictional face in such a lock.

BACKGROUND OF THE INVENTION

Such a lock is used for temporary locking openings in motor vehicles or buildings with the aid of doors or tailgates. In the closed state of such a lock the rotary latch engages around a generally bow-shaped locking bolt also referred to as striker, which in case of a motor vehicle is mounted in most cases on the car body. When, as a result of being rotated from an open position, the rotary latch reaches a closed position, the rotary latch is then locked by means of the pawl. The rotary latch can then no longer be turned back in the direction of the open position and the locking bolt can no longer escape the locking mechanism. For opening, the pawl must be moved out of its detent position.

In the closed position, the blocking faces of the rotary latch and the pawl press against each other during latching. Both blocking faces are generally made of metal. To release the arrangement, one blocking face glides across the other face during which process frictional forces have to be overcome. There is therefore frictional contact between the two pawls.

The rotary latch and the pawl generally contain a hole for an axis extending through the hole, in order to rotatably mount the rotary latch and pawl. Either the rotatable component, i.e. the rotary latch or the pawl can be rotated around the axis or a rigid connection is provided between the rotary latch and the pawl and the axis, which in this case is itself rotatably mounted.

In order to prevent a pawl from being unintentionally moved out of its detent position, a blocking lever can be provided to block such a movement when the rotary latch is locked in a closed position.

A typical arrangement of a locking mechanism of a motor vehicle lock is disclosed in DE 103 20 457 A1. The arrangement and geometric shape of the rotary latch and pawl disclosed therein can also be applied to the present invention.

A locking mechanism of the invention can contain one or several of the above characteristics.

For reasons of stability the rotary latch and the pawl are generally essentially made of metal. At least the major part of these metal parts is covered by a plastic coating in order to minimize opening and closing noises. In FIG. 1 of DE 103 20 457 A1 experts can detect such a typical plastic coating of the rotary latch.

A lock thus contains a plurality of moveable and, in particular, rotatable components. To operate the moveable components it is necessary to provide lubricants at suitable points in order to minimize frictional losses and prevent any blocking of movement. It is thus, for instance, necessary to lubricate axes to maintain a reliable rotating movement. In addition it is also expedient to lubricate some areas, such as the blocking faces, pressed against each other for locking the rotary latch into place. As for unlocking, an associated pawl blocking face must release itself again from an associated rotary latch blocking face by a gliding movement. Such a gliding movement is enhanced by a lubricant. Also, blocking faces moved away from each other by a gliding movement, also advantageously reduce opening noises by providing a gliding agent between the blocking faces.

SUMMARY OF THE INVENTION

The invention has the task of providing a reliable and quietly operating lock of the aforementioned type and a respective process.

The task of the invention is solved by providing a lock with the characteristics of the first claim and a method with the characteristics of the ancillary claim. Advantageous embodiments are disclosed in the sub-claims.

To solve the task, the lock contains a locking mechanism with a rotating rotary latch and at least one ratchet pawl for locking the rotary latch. The lock also contains two faces, abutting at least temporarily against each other and which are at least recurrently displaced in relation to one another so that the displacement creates frictional forces between the two faces. Such a face is hereinafter referred to as frictional face. At least one frictional face is part of a component of the lock that is rotatable or moveable in another way. A lubricant reservoir is assigned to this rotatable or moveable component. A feed means is provided from the lubricant reservoir to the frictional face of the rotatable component, which is designed in such a way that lubricant is transported from the lubricant reservoir to the frictional face, in particular due to rotating movements, capillary forces, other adhesion and cohesion forces or due to spreading of the rotatable component. Transporting of the lubricant can also at least be assisted by vibrations occurring for instance during the operation of a motor vehicle. The result is a continuous relubrication, minimizing frictional forces and noises associated with the friction.

In one embodiment, the distance between the lubricant reservoir and the axis of rotation of the rotatable component is smaller than the distance between the frictional face of the rotatable component and its axis of rotation, in order to at least assist the transportation from the lubricant reservoir to the frictional face through centrifugal forces during a rotating movement. The lubricant reservoir abuts in particular against the rotatable component or is part of the rotatable component. The rotatable component includes, in particular, such a feed means through which the lubricant can be transported from the lubricant reservoir to the frictional face.

Such a feed means from a lubricant reservoir to the frictional face is preferably dimensioned and designed in such a way that lubricant is supplied from the lubricant reservoir to the frictional face as a result of capillary forces, spreading, adhesion and/or cohesion forces or that such forces at least assist with such a supply. The invention is thus based on the concept of not providing a drive for transporting lubricant from the lubricant reservoir to the frictional face and that requires additional energy but only to provide such forces that are required for the operation of the lock or attracting and repelling forces that do not require a separate energy supply.

Where in one embodiment of the invention the lubricant has for instance entered the area of the striker, the lubricant can be absorbed by dust in the area of the striker and in the area of the part of the rotary latch not coated by plastic. This absorption creates a suction effect assisting the transportation of the lubricant. Such a suction effect also constitutes a force that can produce the transportation of the invention or at least assist with such a transportation.

Preferably the feed means extends along the shortest route from the lubricant reservoir to the frictional face. This is, however, not mandatory in order to solve the task of the invention but only expedient as this reduces the required installation space.

The frictional face supplied by a lubricant or lubricating substance, generally has a metal surface. In case of a metal surface with frictional contact, there is an increased requirement for lubrication.

In one embodiment of the invention, the feed means supplies lubricant from the lubricant reservoir to the frictional face through the rotating movements of the rotatable components occurring during operation of the lock. In this way, a regular, relubricating lubrication of the frictional face is provided. Advantageously, this permanently minimizes frictional forces and noises generated by high frictional forces.

In one embodiment of the invention, the feed means contains a coating for the rotatable component, such as a plastic coating around a metal base unit of the rotatable component. An area between the coating and the base unit of the rotatable component through which a lubricant travels from the lubricant reservoir to the frictional face, provides the feed means in this case. This area can be channel-like or contain an extensive surface. The coating contains an outlet abutting the frictional face of the rotatable component, so that a lubricant such as grease or oil reaches the frictional face. This embodiment only requires minimal installation space. At the same time the feed means is well protected. Such an embodiment allows an inventive transportation due to spreading or respective physical forces that can cause spreading.

Rotatable components of the generic lock are generally made of a metal base unit containing a plastic coating. Where such a coating is designed in such a way that a feed means has been provided from the lubricant reservoir to the frictional face, required production work is advantageously minimized.

In one embodiment of the invention, a feed means contains one or several channels or capillaries contributing at least to a lubricant being transported from a lubricant reservoir to a frictional face of the respective rotatable component by a rotating movement of the rotatable component. A coating can be injection-molded around such a channel. In order to prevent such a channel from becoming blocked by plastic during injection molding, a channel can already be filled with a lubricant or with a removable substance.

In one embodiment of the invention the rotatable component is a rotary latch, a pawl and/or a blocking lever. In one embodiment of the invention grease or oil is used as lubricant.

The volume of lubricant transported as a result of the rotary movement and/or in another inventive way, can be regulated by the dimension of the feed means or can in any case be limited to a certain volume. The greater a cross section of the feed means, the more lubricant is transported from the lubricant reservoir to the frictional face as a result of the rotating movement and/or other inventive forces. In one embodiment of the invention the feed means and lubricant reservoir are dimensioned in such a way that lubricant is transported to the frictional face throughout the entire intended service life of the lock or intended number of rotating movements. This is, however, not absolutely necessary for solving the task. Small quantities of lubricants in a lubricant reservoir thus suffice to at least temporarily achieve the described positive effect.

In one embodiment of the invention the lubricant reservoir serves to lubricate two or more frictional faces of the rotatable component. A frictional face can be a face for locking or blocking. A frictional face can be an axle area or a bearing, on which the rotatable component is rotatably mounted. A relative movement therefore suffices for being a rotatable or moveable component in the sense of the present invention.

In one embodiment of the invention, the lubricant reservoir abuts the axle of the rotatable component with the frictional face and/or abuts an associated bearing. As a result, the lubricant reservoir can be advantageously used for lubricating an axis as well as a further frictional face.

BRIEF DESCRIPTION OF THE DRAWINGS

Below, the invention is explained in more detail with reference to FIGS. 1 and 2,
in which.

DETAILED DESCRIPTION OF THE INVENTION

Figure 1:
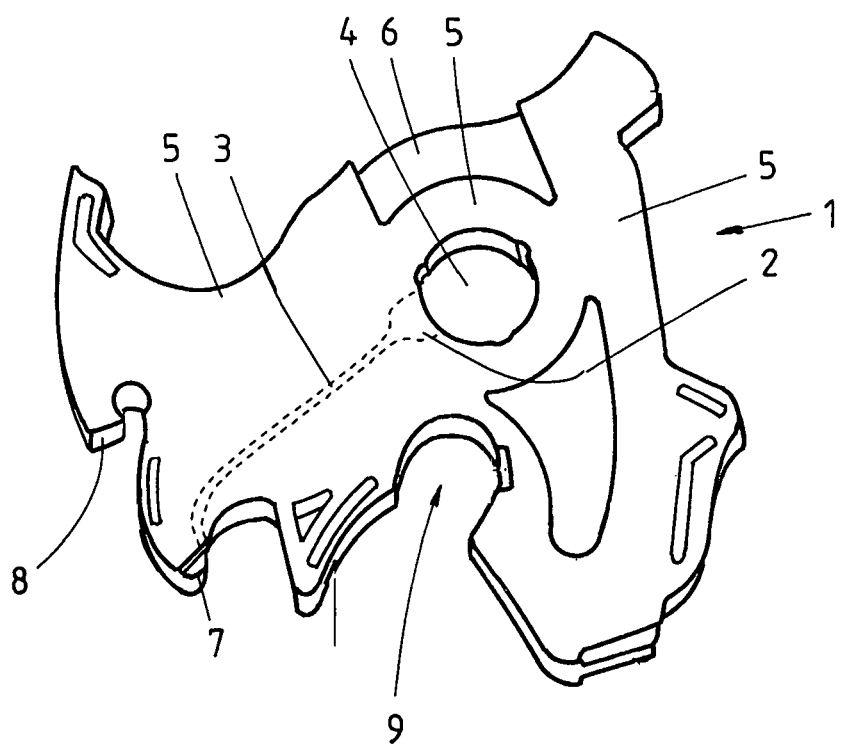
FIG. 1 shows a rotary latch for a locking mechanism

FIG. 1 shows a top view onto a rotary latch 1, i.e. onto a rotatable component of a lock for a motor vehicle. The rotary latch 1 contains a lubricant reservoir 2 and a feed means 3. A hole 4 is provided next to the lubricant reservoir 2 for rotatable mounting of the rotary latch 1. An axle extends through the hole 4 which is secured on a lock plate of the lock—not shown.

Apart from a preferable single-part continuous plastic coating 5, all of the base unit 6 of the rotary latch is made of metal. The lubricant reservoir 2 and the feed means 3 are arranged beneath the plastic coating 5, i.e. between the metal base unit 6 and the plastic coating 5. The lubricant reservoir 2 and feed means 3 are therefore only indicated by dashed lines. The feed means 3 is shown as a small channel area. A feed means 3 can, however, also contain a large area.

The plastic coating 5 extends from the shown top across the lateral contour of the rotary latch 1 up to the bottom and covers the bottom of the rotary latch in the same way as the top.

Figure 2:
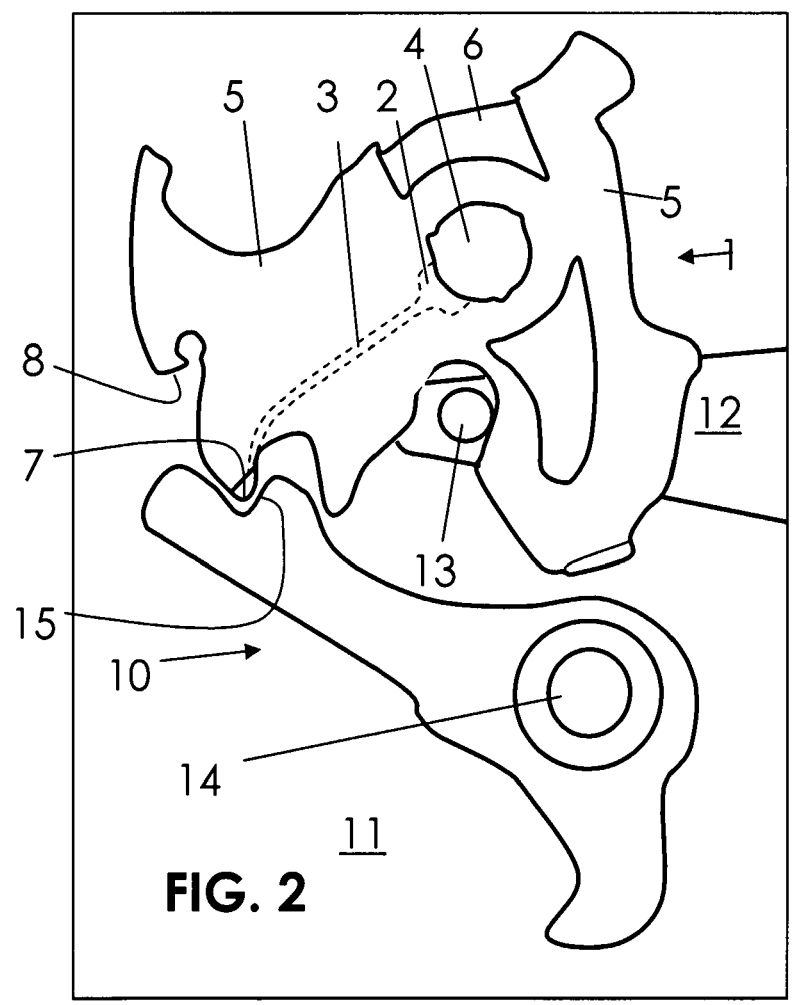
FIG. 2: shows a locking mechanism in the main catch position.

The rotary latch 1 contains a blocking face 7 made of metal and which is not coated by plastic. This blocking face 7 serves for latching the rotary latch 1 in the main catch position as shown in FIG. 2. A metal blocking face 8 serves for latching the rotary latch 1 in the auxiliary catch position. The feed means 3 leads to the blocking face 7. As a result of rotary movements of the rotary latch 1 and/or due to spreading, adhesion or cohesion, lubricant such as grease is transported from the reservoir 2 through the feed means 3 to the blocking face 7. The grease emerges in this area between the coating 5 and the metal base unit 6 and then arrives at the blocking face 7, being a frictional face in the sense of the present invention. Alternatively or in addition, a feed means can lead from reservoir 2 to the blocking face 8.

The rotary latch contains an inlet slot 9, into which a striker engages when an associated door or tailgate is closed. As a result of the closing, a striker or locking bolt rotates the rotary latch from an open position to a closing position, in which the rotary latch is locked by a pawl.

FIG. 2 shows a locking mechanism including a rotary latch 1 of the invention and a pawl 10 in the main catch position. The rotary latch 1 and the pawl 10 are rotatably mounted on a lock plate 11. The lock plate 11 contains an infeed means section 12 into which a locking bolt or striker 13 can be moved. In FIG. 2 the locking bolt 13 is retained by rotary latch 1 so that the locking bolt 13 can no longer leave the locking mechanism.

If the pawl 10 is moved around its axis 14 in counterclockwise direction, the blocking face 7 of the rotary latch glides over the blocking face 15 of the pawl 10. Finally the pawl 10 leaves its latching position releasing rotary latch 1. The rotary latch 1 can then be pivoted in counterclockwise direction into its opened position. The locking bolt 13 can then leave the locking mechanism and a respective door or tailgate can be opened.

LIST OF REFERENCE NUMBERS

1 Rotary latch
2 Lubricant reservoir
3 Feed means
4 Hole
5 Plastic coating
6 Base unit of rotary latch
7 Main blocking face
8 Initial blocking face
9 Inlet slot
10 Pawl
11 Lock plate
12 Inlet section
13 Lock housing
14 Axle of pawl
15 Pawl-blocking face

The invention claimed is:

1. A lock comprising a locking mechanism mounted on a lock housing, the locking mechanism comprising:
    a rotary latch having a base unit and a frictional face;
    a pawl for latching the rotary latch and having a frictional face that is engageable with the frictional face of the rotary latch for frictional contact therebetween;
    a lubricant reservoir that is spaced from the frictional face of the rotary latch by the base unit of the rotary latch; and
    a feed means that includes a channel or extensive surface that extends along the base unit of the rotary latch for feeding lubricant from the lubricant reservoir and across the base unit of the rotary latch to the frictional face of the rotary latch.

2. The lock according to claim 1, wherein a distance between the lubricant reservoir and an axis of rotation of the rotary latch is smaller than a distance between the frictional face of the rotary latch and the axis of rotation.

3. The lock according to claim 1, wherein the lubricant reservoir is part of the rotary latch and/or the feed means is part of the rotary latch.

4. The lock according to claim 1, wherein the feed means extends along the shortest route between the lubricant reservoir and the frictional face of the rotary latch.

5. The lock according to claim 1, wherein the frictional face of one or both of the rotary latch and the pawl is made of metal.

6. The lock according to claim 1, wherein the rotary latch includes a coating that coats the base unit, and the feed means extends between the base unit and the coating of the base unit.

7. The lock according to claim 6, wherein the base unit is made of metal and the coating is made of plastic.

8. The lock according to claim 1, wherein the feed means contains a capillary.

9. The lock according to claim 1, wherein grease or oil is used as the lubricant within the lubricant reservoir.

10. The lock according to claim 1, wherein the frictional face of the rotary latch is a blocking face.

11. A method for the operation of a lock according to claim 1, in which the lubricant is transported from the lubricant reservoir to the frictional face of the rotary latch as a result of the rotation movements of the rotary latch, adhesion forces, cohesion forces, and/or as a result of spreading.

12. The lock according to claim 1, wherein the lubricant reservoir abuts against the base unit of the rotary latch when the lubricant is fed from the lubricant reservoir to the frictional face of the rotary latch.

* * * * *